United States Patent
Oelgoetz et al.

[19]

[11] Patent Number: 6,138,895
[45] Date of Patent: Oct. 31, 2000

[54] MANUAL ADJUSTABLE PROBE TOOL FOR FRICTION STIR WELDING

[75] Inventors: Peter A. Oelgoetz, Huntsville; Jeff Ding, Athens, both of Ala.

[73] Assignees: The Boeing Company, Seal Beach, Calif.; The United States of America as represented by the Administrator of the National Aeronautics and Space Administration, Washington, D.C.

[21] Appl. No.: 09/104,424

[22] Filed: Jun. 25, 1998

[51] Int. Cl.[7] ...................................................... B23K 20/12
[52] U.S. Cl. .......................................... 228/112.1; 228/2.1
[58] Field of Search .................................... 228/2.1, 112.1

[56] References Cited

U.S. PATENT DOCUMENTS

| | | |
|---|---|---|
| 4,144,110 | 3/1979 | Luc . |
| 4,605,151 | 8/1986 | Brown . |
| 4,811,887 | 3/1989 | King et al. . |
| 5,460,317 | 10/1995 | Thomas et al. . |
| 5,611,479 | 3/1997 | Rosen ..................................... 228/112.1 |
| 5,624,067 | 4/1997 | Harwig et al. . |
| 5,697,511 | 12/1997 | Bampton ................................ 220/4.12 |
| 5,697,544 | 12/1997 | Wykes ....................................... 228/2.1 |
| 5,713,507 | 2/1998 | Holt et al. ............................. 228/112.1 |
| 5,718,366 | 2/1998 | Colligan ................................ 228/112.1 |
| 5,758,999 | 6/1998 | Geise ........................................ 409/231 |
| 5,769,306 | 6/1998 | Colligan ................................ 228/112.1 |
| 5,794,835 | 8/1998 | Colligan et al. .......................... 228/2.1 |
| 5,813,592 | 9/1998 | Midling et al. ....................... 228/112.1 |
| 5,829,664 | 11/1998 | Spinella et al. ....................... 228/112.1 |
| 5,862,975 | 1/1999 | Childress ................................. 228/120 |
| 5,893,507 | 4/1999 | Ding et al. ............................... 228/2.1 |

FOREIGN PATENT DOCUMENTS

WO 93/10935 6/1993 WIPO .
WO 95/26254 10/1995 WIPO .

*Primary Examiner*—Gregory Mills
*Assistant Examiner*—Kiley Stoner
*Attorney, Agent, or Firm*—Christensen, O'Connor, Johnson & Kindness, PLLC

[57] ABSTRACT

A friction stir welding tool is provided generally comprising three parts: a rotatable welding tool body (22) that has an outer threaded surface (32) and a probe (24) extending from a distal end of the body, a shoulder (26), which has a threaded inner surface (40) and a bore (36) at a distal end of the shoulder, and a jam nut (28), which has a threaded inner surface (42). The shoulder is threaded onto the tool body such that the probe extends from the shoulder through the bore by a preferred length. The jam nut is then threaded onto the tool body to secure the shoulder. The tool is operatively connected to a drive motor for rotating the tool body. The shoulder may include a knife edge projecting from the distal end (38) thereof adjacent the bore. The knife edge inhibits the weld material from migrating along the probe to intrude inside the shoulder, where it may prevent separation of the tool body and the shoulder when readjustment of the tool is necessary.

8 Claims, 4 Drawing Sheets

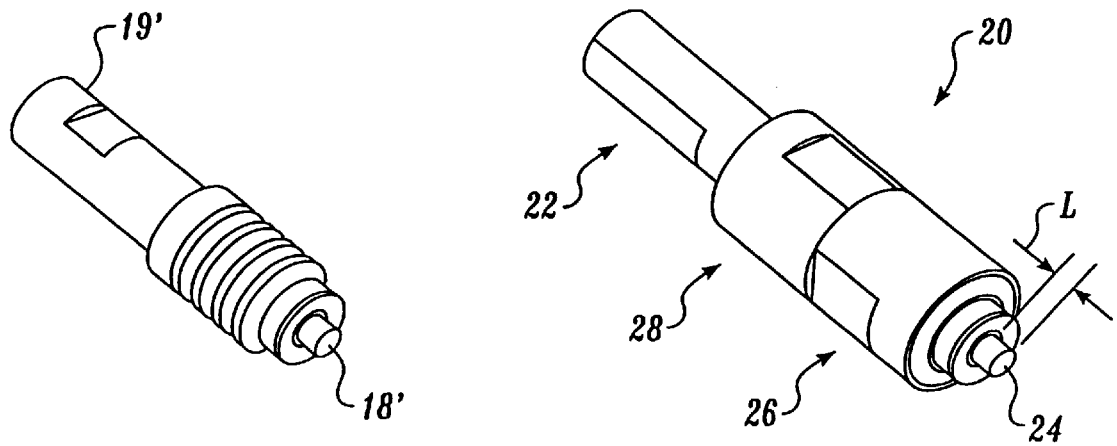
*(Prior Art)*
Fig. 2A
Fig. 2B
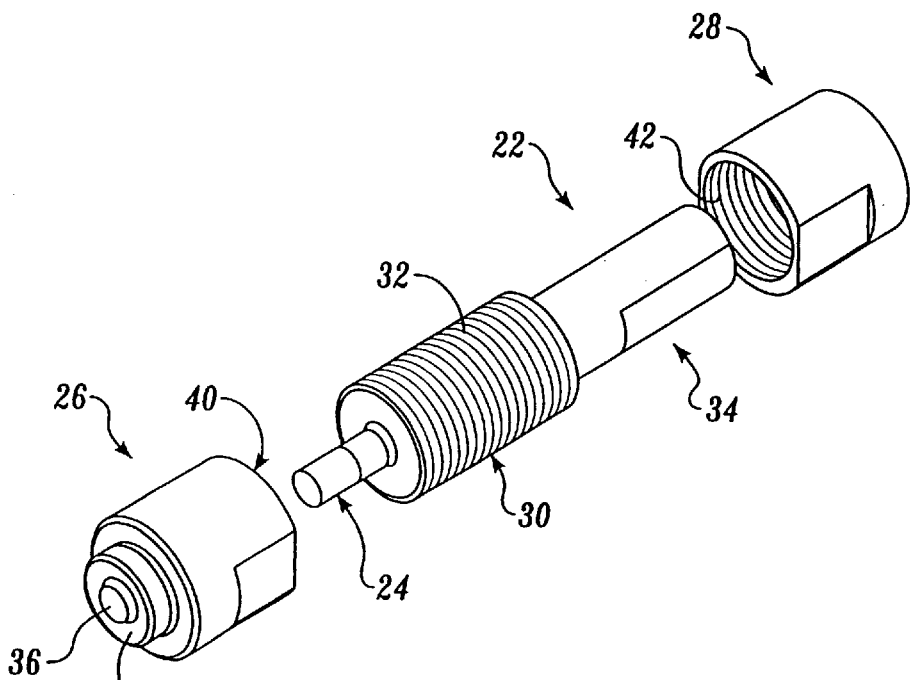
Fig. 3

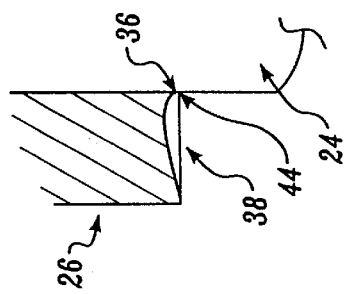
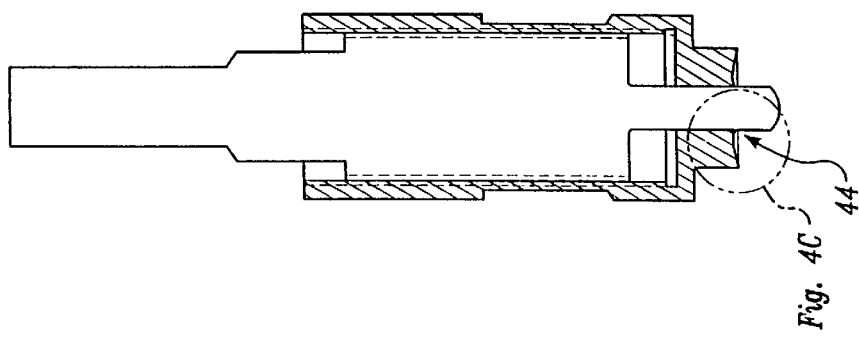
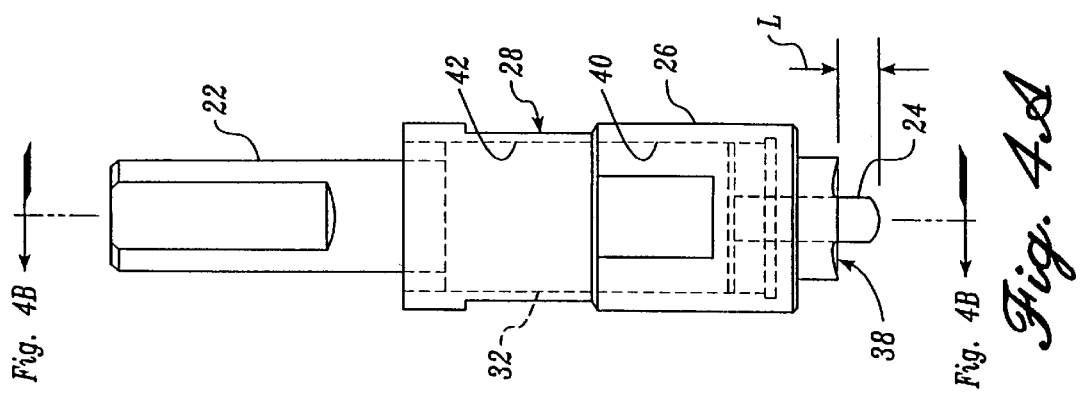

MANUAL ADJUSTABLE PROBE TOOL FOR FRICTION STIR WELDING

GOVERNMENT RIGHTS IN THE INVENTION

The U.S. Government has a paid-up license in this invention and the right in limited circumstances to require the patent owner to license others on reasonable terms as provided for by the terms of Contract No. NAS8-45000 awarded by National Aeronautics and Space Administration (NASA).

FIELD OF THE INVENTION

This invention relates to a friction stir welding tool, and more particularly to a welding tool having a probe wherein the exposed length of the probe can be adjusted.

BACKGROUND OF THE INVENTION

Friction stir welding (FSW) is a relatively new welding process for joining together parts of materials such as metals, plastics, and other materials that will soften and commingle under applied frictional heat to become integrally connected. A detailed description of the FSW apparatus and process may be found in Patent Publications WO 93/10935; WO 95/26254; and U.S. Pat. No. 5,460,317, all of which are herein fully incorporated by reference. One useful apparatus for FSW is shown in FIGS. 1A and 1B. As shown, two parts, exemplified by plates 10A', and 10B' on a backing plate 12' are aligned so that edges of the plates to be welded together are held in direct contact. An FSW tool W' has a shoulder 14' at its distal end, and a nonconsumable welding probe 16' extending downward centrally from the shoulder. As the rotating tool W' is brought into contact with the interface between plates 10A' and 10B', the rotating probe 16' is forced into contact with the material of both plates, as shown. The rotation of the probe in the material and rubbing of the shoulder against the upper surface of the material produce a large amount of frictional heating of both the welding tool and the plate interface. This heat softens the material of the plates in the vicinity of the rotating probe and shoulder, causing commingling of material which, upon hardening, forms a weld. The tool is moved longitudinally along the interface between plates 10A' and 10B', thereby forming an elongate weld along the interface between the plates. The welding tool's shoulder 14' prevents softened material from the plates from escaping upward, and forces the material into the weld joint. When the weld is completed, the welding tool is retracted.

In order to produce a sound weld it is necessary to vary the length of the probe 16' according to a specific material thickness so that the probe extends substantially through the entire thickness of the material. This ensures that there is sufficient frictional heating to soften the plate material and that the material is welded through the full thickness of the plates 10A' and 10B'. When an FSW tool having a probe of fixed length is used for welding materials having a thickness outside the narrow range that the fixed length probe can effectively weld, incompletely consolidated weld joints with poor fracture strength and toughness are produced. Currently, to avoid producing poor welds, each tool is configured for a specific material thickness. Accordingly, different FSW tools, each with a specific probe length, are required for producing welds of different thicknesses. This significantly increases tool inventory costs as well as process costs associated with the time required to replace a tool suitable for producing a weld of one thickness with a tool suitable for producing a weld of a different thickness. A need exists for an FSW tool capable of producing welds of differing thicknesses.

SUMMARY OF THE INVENTION

The present invention provides a friction stir welding (FSW) tool having a probe wherein the exposed length of the probe can be varied. A single FSW tool of the invention can be used for welding materials of various thicknesses by simply adjusting the probe length. This significantly reduces tool inventory costs, and at the same time, increases the welding process's robustness and reduces its overall operating costs.

An FSW tool of the present invention generally comprises three parts: a rotatable welding tool body that has an outer threaded surface and a probe extending from a distal end of the body, a shoulder that has a threaded inner surface and a bore at a distal end of the shoulder, and a jam nut that has a threaded inner surface. The shoulder is threaded onto the tool body such that the probe extends through the bore in the shoulder. The exposed length of the probe extending beyond the shoulder is determined by the relative position of the shoulder on the tool body. The jam nut is threaded onto the tool body to secure the shoulder and prevent its movement. The tool having its probe length adjusted as described above is operatively connected to a drive motor for rotating the tool body. In a preferred embodiment of the present invention, the shoulder further includes a knife edge projecting from the distal end thereof adjacent the bore. The knife edge inhibits plasticized weld material from intruding into an annular cavity between the bore periphery and the probe where it can impede the separation of the shoulder and the tool body when the tool is readjusted for another probe length.

The invention also provides a method of adjusting the exposed length of a probe of an FSW tool. The method includes providing an FSW tool with an adjustable-length probe, determining the optimal length of the probe for a particular FSW operation based on various parameters, and manually adjusting the probe length of the FSW tool.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 2A is a perspective view showing a typical prior art friction stir welding tool with a fixed-length probe;

FIG. 2B is a perspective view showing an embodiment of a friction stir welding tool with an adjustable-length probe according to the present invention;

FIG. 3 is an exploded view showing an embodiment of the friction stir welding tool of FIG. 2B;

FIG. 4A is a schematic side view showing an embodiment of the friction stir welding tool of FIG. 2B;

FIG. 4B is a cross-sectional view of FIG. 4A;

FIG. 4C is an enlarged view of the distal end of the shoulder in FIG. 4B illustrating a knife edge of the present invention;

DETAILED DESCRIPTION OF THE PREFERRED EMBODIMENT

Figure 1A:
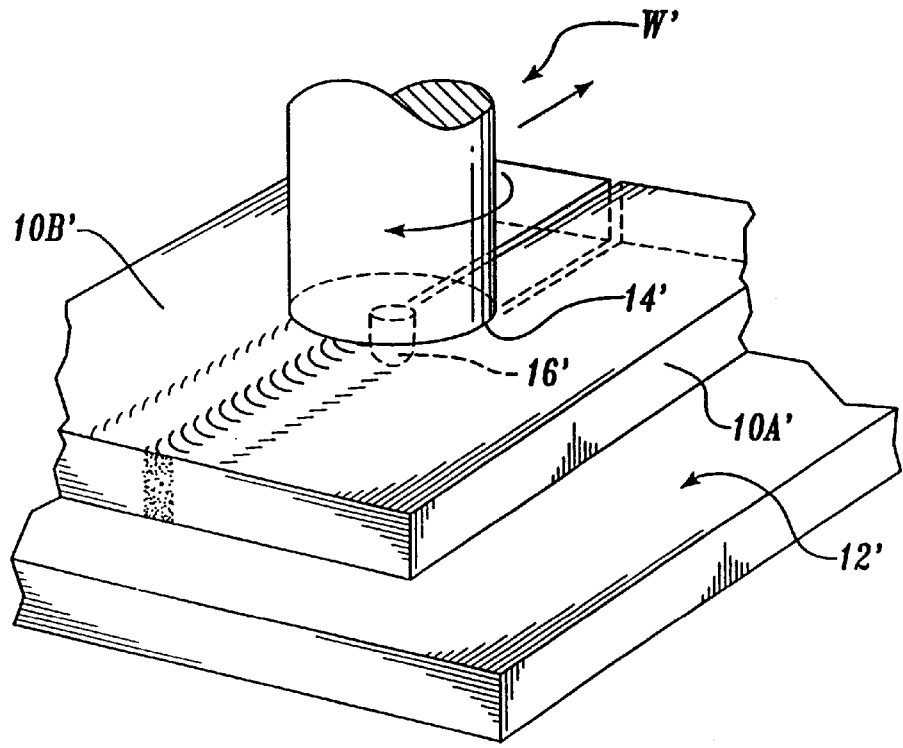
FIG. 1A is a schematic diagram of a prior art friction stir welding apparatus.
Figure 1B:
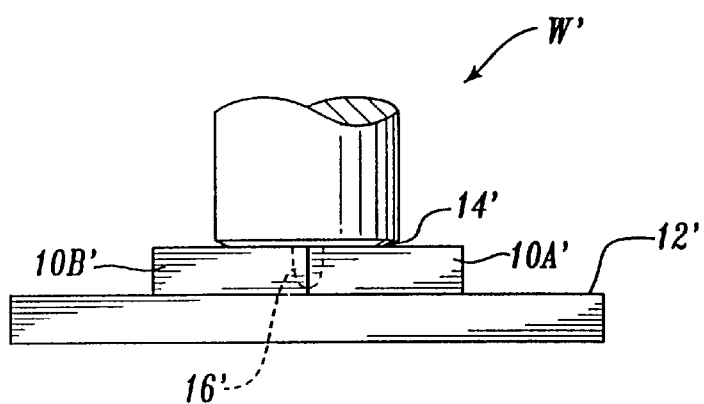
FIG. 1B is a schematic end view showing a prior art friction stir welding apparatus.

The invention provides a friction stir welding (FSW) tool that has an adjustable-length probe, and thus is capable of producing robust welds in workpieces of various thicknesses. Reference to the length of the probe in the following description refers to the length of the probe that is exposed and available for plunging into the materials to be welded. The FSW tool of the invention achieves this flexibility by permitting displacement of the tip of the probe relative to a shoulder surrounding the probe, as described below in more detail.

FIG. 2A illustrates a conventional prior art FSW tool comprising a one-piece construction with a fixed-length probe 18'. A proximal end 19' of the tool is configured to fit in any appropriate standard-end mill tool holder. FIG. 2B is a perspective view of an FSW tool with an adjustable-length probe according to the present invention. Referring additionally to FIG. 3, an FSW tool of the present invention with an adjustable-length probe 20 generally comprises three parts: a rotatable tool body 22 having a probe 24 extending from a distal end thereof, a shoulder 26, and a jam nut 28. The probe length, defined as a distance between the tip of probe 24 and a distal end 38 of shoulder 26, is represented by "L".

Rotatable tool body 22 includes a middle section 30 having a threaded outer surface 32 and a proximal end section 34, which is separated from probe 24 by middle section 30, for coupling to a tool holder, not shown. Shoulder 26 comprises a circular sleeve, open at its proximal end and substantially closed at its distal end 38. Shoulder 26 has a centered bore 36 at its distal end 38, and a threaded inner surface 40. Threaded inner surface 40 mates with threaded outer surface 32 of rotatable tool body 22, so that shoulder 26 can be threaded onto middle section 30 of rotatable tool body 22 with probe 24 passing through distal end 38 of shoulder 26 via bore 36.

Jam nut 28 comprises a circular sleeve open at both ends. The inner surface 42 of jam nut 28 is threaded so that jam nut 28 can be threaded onto middle section 30 of rotatable tool body 22 and secured against the proximal end of shoulder 26. Proximal end section 34 of rotatable tool body 22 is then coupled to a tool holder, not shown, which is operatively connected to a drive motor for rotating the tool body 22. Accordingly, during welding, shoulder 26 is secured in place by jam nut 28, which is further held in position between shoulder 26 and the forward face of the tool holder. In this arrangement, shoulder 26, jam nut 28, and the tool holder all cooperate to prevent displacement of shoulder 26 in the proximal direction relative to rotatable tool body 22. Displacement of shoulder 26 in the distal direction is opposed by the workpieces that are being welded. Securing shoulder 26 relative to rotatable tool body 22 ensures that the exposed probe length, defined as the displacement of the tip of probe 24 relative to distal end 38 of shoulder 26, will be maintained during the FSW process. After each welding process, any smeared material left on the tool is removed with an appropriate cleaning medium, such as sodium hydroxide solution for removing aluminum. The exposed length of probe 24 can then be readily adjusted by varying the displacement of shoulder 26 along rotatable tool body 22 onto which shoulder 26 is threaded.

FIG. 4A shows a side view of an FSW tool of the present invention illustrating the threaded interfaces of the tool. As shown, threaded inner surface 40 of shoulder 26 and threaded inner surface 42 of jam nut 28 both interface with threaded outer surface 32 of rotatable tool body 22. The area of the threaded interface is chosen so that shoulder 26 and jam nut 28 remain at rest relative to rotatable tool body 22, thereby maintaining the exposed length of probe 24, represented by "L", during welding.

During FSW, plasticized material is collected around probe 24 at distal end 38. Due to rotation of probe 24, most of the plasticized material is crushed and forged into a homogeneous material behind the FSW probe tool. However, some of the plasticized material is pushed forward and tends to wick in between the outer surface of probe 24 and the periphery of bore 36. As this plasticized material begins to harden, it makes it difficult to separate shoulder 26 and rotatable tool body 22 after welding. In a preferred embodiment, the present invention provides a knife edge 44, shown in FIGS. 4B and 4C, to inhibit the intrusion problem. FIG. 4B is a cross-sectional view of FIG. 4A, and its circled section includes knife edge 44 of the present invention. FIG. 4C is an enlarged view of the circled section, better illustrating knife edge 44. Knife edge 44 projects from distal end 38 of shoulder 26 adjacent bore 36. Knife edge 44 promotes distribution of plasticized material away from probe 24 and inhibits the plasticized weld material from intruding between probe 24 and shoulder 26, thus making it easier to readjust the tool of the invention for another probe length after each welding operation. In the embodiment shown in FIGS. 4A–4C, knife edge 44 does not extend distally along probe 24 beyond the outer periphery of distal end 38 of shoulder 26. To accomplish the above, distal end 38 of shoulder 26 of an FSW tool of the present invention may include a recessed surface that is peaked inward and upward toward its center at an acute angle from the outer periphery of distal end 38, to form a substantially concave recess, as shown in FIGS. 4A–4C.

Figure 5A:
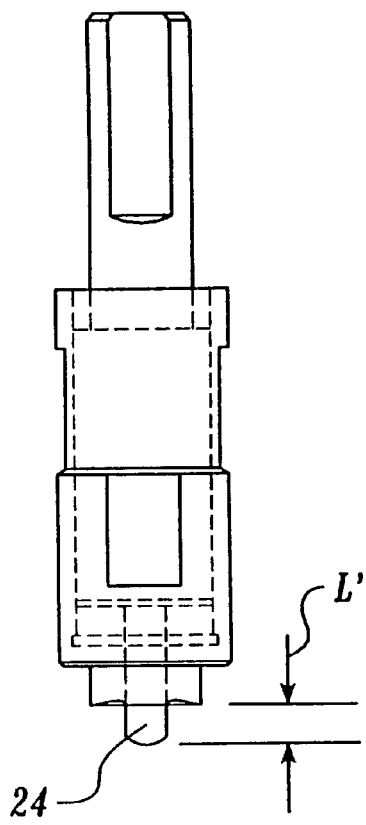
FIG. 5A is a schematic side view illustrating a tool of the present invention with a relatively short exposed length of a probe.
Figure 5B:
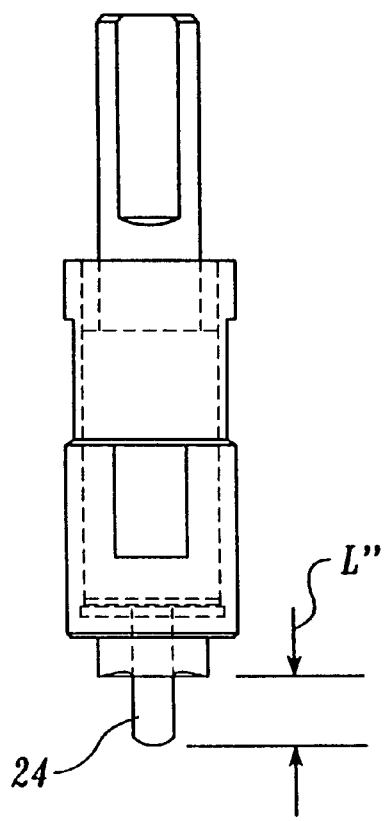
FIG. 5B is a schematic side view illustrating a tool of the present invention with a relatively long exposed length of a probe.

FIGS. 5A and 5B illustrate an FSW tool of the present invention with a relatively short exposed length L' of probe 24 and a relatively long exposed length L" of probe 24, respectively.

The invention also provides a method of adjusting the length of a probe of a friction stir welding tool. The method includes providing a friction stir welding tool of the invention having a rotatable welding tool body with a probe extending from its distal end, a shoulder, and a jam nut, which permits adjustment of the exposed length of the probe. The method determines a proper probe length to ensure a thorough welding of workpieces using parameters such as the thickness of the material to be welded. The exposed length of the probe of the FSW tool is manually adjusted prior to initiation of the welding process.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A friction stir welding tool having a probe wherein an exposed length thereof can be adjusted, the tool comprising:
   (a) a rotatable welding tool body having an outer threaded surface and a probe extending from a distal end of the body;
   (b) a shoulder having a threaded inner surface and a bore for allowing the probe to pass through the shoulder, the shoulder threaded onto the distal end of the tool body; and (c) a jam nut having a threaded inner surface threaded onto the tool body, the jam nut separated from the probe by the shoulder, the jam nut being adapted to secure the shoulder relative to the tool body, after the shoulder is adjustably threaded onto the tool body, to maintain the exposed length of the probe.

2. The tool of claim 1, wherein the exposed length of the probe is adjusted by displacing the shoulder along the length of the tool body.

3. The tool of claim 1, wherein the jam nut limits the displacement of the shoulder along the tool body.

4. The tool of claim 1, further comprising a knife edge projecting from the distal end of the shoulder adjacent the bore.

5. A method of adjusting an exposed length of a probe of a friction stir welding tool, the method comprising:
   (a) providing a friction stir welding tool comprising:
      (i) a rotatable welding tool body having an outer threaded surface and a probe extending from a distal end of the tool body;
      (ii) a shoulder having a threaded inner surface and a bore for allowing the probe to pass through the shoulder, the shoulder threaded onto the distal end of the tool body; and
      (iii) a jam nut having a threaded inner surface threaded onto the tool body, the jam nut separated from the probe by the shoulder;
   (b) determining a proper displacement between a distal end of the probe and the shoulder to provide a desired probe length;
   (c) manually varying the displacement between the distal end of the probe and the shoulder; and
   (d) securing the shoulder relative to the tool body, after the displacement between the probe and shoulder is varied, to maintain the exposed length of the probe.

6. The method of claim 5, wherein the exposed length of the probe is adjusted by displacing the shoulder along the length of the tool body.

7. The method of claim 5, wherein the displacement of the shoulder along the tool body is limited by the jam nut.

8. The method of claim 5, further comprising providing a knife edge projecting from the distal end of the shoulder adjacent the bore.

\* \* \* \* \*